(12) United States Patent
Kotler et al.

(10) Patent No.: US 9,746,995 B2
(45) Date of Patent: Aug. 29, 2017

(54) LAUNCHER FOR CONTEXT BASED MENUS

(75) Inventors: Matthew Kotler, Sammamish, WA (US); Vignesh Sachidanandam, Mercer Island, WA (US); Erez Kikin Gil, Redmond, WA (US); Mark Pearson, Renton, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1361 days.

(21) Appl. No.: 13/281,825

(22) Filed: Oct. 26, 2011

(65) Prior Publication Data

US 2013/0019172 A1  Jan. 17, 2013

Related U.S. Application Data

(60) Provisional application No. 61/507,983, filed on Jul. 14, 2011.

(51) Int. Cl.
*G06F 3/0482* (2013.01)
*G06F 3/0489* (2013.01)
(Continued)

(52) U.S. Cl.
CPC .......... *G06F 3/0482* (2013.01); *G06F 3/0488* (2013.01); *G06F 3/04817* (2013.01); *G06F 3/04883* (2013.01); *G06F 3/04895* (2013.01)

(58) Field of Classification Search
CPC ............. G06F 3/04895; G06F 3/04817; G06F 3/04812
See application file for complete search history.

(56) References Cited

U.S. PATENT DOCUMENTS 5,664,133 A * 9/1997 Malamud .............. G06F 3/0482
345/902
5,805,167 A * 9/1998 van Cruyningen ... G06F 3/0482
715/808

(Continued)

FOREIGN PATENT DOCUMENTS

CN 101059748 A 10/2007
CN 101984657 A 3/2011
(Continued)

OTHER PUBLICATIONS

"Context Menus and Sub-Menus", Retrieved at <<http://ignorethecode.net/blog/2009/03/21/context-menus-sub-menus/>>, Mar. 21, 2009, pp. 9.

(Continued)

*Primary Examiner* — Ryan Pitaro
(74) *Attorney, Agent, or Firm* — Turk IP Law, LLC

(57) ABSTRACT

A launching mechanism for context based menus is provided. A launcher indicator may be provided at a fixed or dynamic location on a user interface enabling a user to activate a context based menu through a variety of touch or gesture actions, as well as keyboard, mouse, or similar device inputs, directly related to the indicator or through inference from an action on the displayed content such as selection of a portion of the content. The launcher indicator may provide contextual information such as a type of available context based menu and appear/disappear in an animated fashion. Location of the indicator may also be dynamically adjusted based on selected content, user action location (i.e., location of a touch), available display area, and so on. Upon activation of the menu, the launcher indicator may disappear or be displayed at a center of the context based menu.

19 Claims, 13 Drawing Sheets

(51) Int. Cl.
    *G06F 3/0481* (2013.01)
    *G06F 3/0488* (2013.01)

(56) References Cited

U.S. PATENT DOCUMENTS

| | | | |
|---|---|---|---|
| 6,281,879 | B1 | 8/2001 | Graham |
| 6,542,164 | B2 | 4/2003 | Graham |
| 6,816,202 | B1* | 11/2004 | Sezaki ............... H04N 5/45 348/511 |
| 6,828,988 | B2 | 12/2004 | Hudson et al. |
| D563,972 | S | 3/2008 | Sherry |
| 7,533,340 | B2 | 5/2009 | Hudson et al. |
| 7,570,943 | B2 | 8/2009 | Sorvari et al. |
| 7,710,409 | B2 | 5/2010 | Robbin et al. |
| 7,712,049 | B2 | 5/2010 | Williams et al. |
| 7,895,531 | B2 | 2/2011 | Radtke et al. |
| 8,239,882 | B2 | 8/2012 | Dhanjal et al. |
| 8,245,156 | B2 | 8/2012 | Mouilleseaux et al. |
| 8,402,391 | B1* | 3/2013 | Doray ............... G06F 3/0482 715/834 |
| 2004/0075695 | A1 | 4/2004 | Chew et al. |
| 2004/0160427 | A1 | 8/2004 | Keely et al. |
| 2004/0207658 | A1* | 10/2004 | Awada ............... G06F 9/4443 715/747 |
| 2005/0216834 | A1 | 9/2005 | Gu |
| 2005/0235317 | A1* | 10/2005 | Green ............... G11B 27/034 725/46 |
| 2006/0069603 | A1* | 3/2006 | Williams ........... G06F 3/0482 715/834 |
| 2007/0055936 | A1 | 3/2007 | Dhanjal et al. |
| 2007/0168890 | A1 | 7/2007 | Zhao et al. |
| 2007/0180392 | A1 | 8/2007 | Russo |
| 2007/0198949 | A1 | 8/2007 | Rummel |
| 2007/0256029 | A1 | 11/2007 | Maxwell |
| 2007/0271528 | A1† | 11/2007 | Park et al. |
| 2008/0225013 | A1* | 9/2008 | Muylkens ........... G06F 3/04883 345/173 |
| 2009/0019395 | A1* | 1/2009 | Radom ............... G06F 3/0237 715/816 |
| 2009/0037813 | A1† | 2/2009 | Newman et al. |
| 2009/0083665 | A1 | 3/2009 | Anttila et al. |
| 2009/0309849 | A1 | 12/2009 | Iwema et al. |
| 2009/0327963 | A1† | 12/2009 | Mouilleseaux et al. |
| 2010/0083190 | A1 | 4/2010 | Roberts et al. |
| 2010/0083191 | A1* | 4/2010 | Marshall ............ G06F 1/1626 715/863 |
| 2010/0122194 | A1 | 5/2010 | Rogers |
| 2010/0180233 | A1 | 7/2010 | Kruzeniski et al. |
| 2010/0192102 | A1† | 7/2010 | Chmielewski et al. |
| 2010/0192103 | A1 | 7/2010 | Cragun et al. |
| 2010/0257447 | A1 | 10/2010 | Kim et al. |
| 2010/0281374 | A1* | 11/2010 | Schulz ............... G06F 3/0482 715/723 |
| 2010/0299635 | A1 | 11/2010 | Oh et al. |
| 2010/0299637 | A1 | 11/2010 | Chmielewski et al. |
| 2010/0306702 | A1 | 12/2010 | Warner |
| 2011/0066981 | A1* | 3/2011 | Chmielewski ....... G06F 3/0482 715/834 |
| 2011/0209093 | A1 | 8/2011 | Hinckley et al. |
| 2011/0248928 | A1 | 10/2011 | Michaelraj |
| 2012/0042006 | A1 | 2/2012 | Kiley et al. |
| 2012/0113001 | A1* | 5/2012 | Yamauchi .......... G06F 3/038 345/157 |
| 2012/0221976 | A1 | 8/2012 | Johns |

FOREIGN PATENT DOCUMENTS

| | | |
|---|---|---|
| JP | H06242885 A | 9/1994 |
| JP | 2005257948 A | 9/2005 |
| JP | 2007511003 A | 4/2007 |
| JP | 2008509473 A | 3/2008 |
| JP | 2009037583 A | 2/2009 |
| JP | 2010530578 A | 9/2010 |
| WO | 2005047400 A2 | 5/2005 |

OTHER PUBLICATIONS

Nguyen, Chuong, "Apple Patent Reveals GUI with Radial Pop-Up Menus in iOS", Retrieved at <<http://www.ubergizmo.com/2010/12/apple-patent-reveals-gui-with-radial-pop-up-menus-in-ios/>>, Feb. 12, 2010, pp. 3.

Koenig, Joerg, "Radial Context Menu", Retrieved at <<http://www.codeproject.com/KB/system/RadialContextMenu.aspx>>, Jul. 21, 2005, pp. 4.

"Pie menu", Retrieved at <<http://web.archive.org/web/20110331143948/http://en.wikipedia.org/wiki/Pie_menu>>, Mar. 31, 2011, pp. 5.

Hopkins, Don, "Pie Menus on Python/GTK/Cairo for OLPC Sugar", Retrieved at <<http://web.archive.org/web/20110515030103/http://www.donhopkins.com/drupal/node/128>>, May 15, 2011, pp. 10.

"Pie in the Sky", Retrieved at <<http://web.archive.org/web/20100702160443/http://jonoscript.wordpress.com/2008/10/28/pie-in-the-sky/>>, Jul. 2, 2010, pp. 33.

Fitzmaurice, et al., "PieCursor: Merging Pointing and Command Selection for Rapid In-place Tool Switching", Retrieved at <<http://www.autodeskresearch.com/pdf/p1361-fitzmaurice.pdf>>, In Proceedings of the SIGCHI Conference on Human Factors in Computing Systems, Apr. 5, 2008, pp. 10.

"Autodesk Inventor Fusion: Getting Started", Retrieved at <<http://images.autodesk.com/emea_s_main/files/Getting_Started.pdf>>, Retrieved Date: Dec. 28, 2012, pp. 9-18.

"Wacom Tablets. The basics.", Retrieved at <<http://images.autodesk.com/emea_s_main/files/Getting_Started.pdf>>, Feb. 25, 2011, pp. 11.

"ATOK for Android", Retrieved at <<http://www.youtube.com/watch?v=bZiDbz0aJKk>>, Jun. 9, 2012, pp. 2.

"Google Reveals Possible Radial Styled Menus Coming to Android", Retrieved at <<http://www.patentbolt.com/2012/07/google-reveals-possible-radial-styled-menus-coming-to-android.html>>, Jul. 31, 2012, pp. 9.

"Apple Granted a Major Radial Menus Patent for iOS and OS X", Retrieved at <<http://www.patentlyapple.com/patently-apple/2012/08/apple-granted-a-major-radial-menus-patent-for-ios-and-os-x.html>>, Aug. 14, 2012, pp. 12.

"iOS Human Interface Guidelines", in "iOS Human Interface Guidelines," Mar. 23, 2011, Apple, Inc. pp. 1-156, Available at: http://intra.iam.hva.nl/content/1011/propedeuse/hci/intro-en-materiaal/MobileHIG.pdf.

Carlson, Jeff, "22 Useful iPad Tips", TidBITS—Apple news for the rest of us, Apr. 6, 2010, pp. 1-7 Available at: http://tidbits.com/article/11167.

"Supplementary European Search Report Issued in European Application No. 12810955.0", Mailed Date: Feb. 9, 2015, 7 Pages.

Rado, et al., "rAir Flow Menus: Toward Reliable 3D Gestural Input for Radial Marking Menus", Retrieved at <<http://ivlab.cs.umn.edu/pdf/Rado-2009-rAirFlowMenusAbstract.pdf>>, SIGGRAPH, 2009, p. 1.

"Radial menu launcher", Retrieved at <<http://www.ff00aa.com/en/archives/2007/02/27/7611-radial-menu-launcher/>>, Feb. 27, 2007, p. 1.

"Wave Launcher v1.5.1 (1.5.1) Android Apk App", Retrieved at <<http://mobileplanet-waryam.blogspot.com/2011/06/wave-launcher-v151-151-android-apk-app.html>>, Retrieved Date: Aug. 30, 2011, pp. 6.

"Context Based Menus", Application No. 61507983, Filed Date: Jul. 14, 2011, pp. 136.

"Compact Control Menu for Touch-Enabled Command Execution", Application No. 13090438, Filed Date: Apr. 20, 2011, pp. 27.

"International Search Report", Mail Date: Dec. 27, 2012, Application No. PCT/US2012/046823, Filed date: Jul. 14, 2012, pp. 9.

"Office Action Issued in Japanese Patent Application No. 2014-520399", Mailed Date: May 31, 2016, 10 Pages.

"First Office Action Issued in Chinese Patent Application No. 201280034804.2", Mailed Date: Feb. 23, 2016, 9 Pages.

"Second Office Action Issued in Chinese Patent Application No. 201280034804.2", Mailed Date: Oct. 31, 2016, 7 Pages.

(56) References Cited

OTHER PUBLICATIONS

"Office Action Issued in Australian Patent Application No. 2012283792", Mailed Date: Aug. 24, 2016, 4 Pages.

\* cited by examiner
† cited by third party

LAUNCHER FOR CONTEXT BASED MENUS

CROSS REFERENCE TO RELATED APPLICATIONS

This application claims the benefit of U.S. Provisional Patent Application Ser. No. 61/507,983 filed on Jul. 14, 2011. The disclosures of the provisional patent application are hereby incorporated by reference for all purposes.

BACKGROUND

With the proliferation of computing and networking technologies, two aspects of computing devices have become prevalent: non-traditional (e.g., mouse and keyboard) input mechanisms and smaller form factors. User interfaces for all kinds of software applications have been designed taking typical screen sizes and input mechanisms into account. Thus, user interactions in conventional systems are presumed to be through keyboard and mouse type input devices and a minimum screen size that enables users to interact with the user interface at a particular precision.

Menus for touch-enabled or gesture-enabled devices have special constraints and challenges. For example, such menus need to be touch and gesture enabled, and accessible with less precision than a mouse. The menus may not occupy extensive screen area and need to be flexible to changes in available screen area (e.g., landscape/portrait changes, different resolutions, appearance/disappearance of a virtual keyboard, etc.). The menus needs to make use of features specific to touch devices (e.g., response to different gestures) and still work with a traditional mouse and keyboard. Users may tend to perform bursts of work on productivity applications on mobile devices—mainly read-only—not likely to be editing a long document for long hours on a mobile device. Thus, conventional menus are not geared to address this use model. They are also not comfortable and efficient in different contexts and/or positions (e.g., one finger/use of thumb/down on desk and typing). Furthermore, the command experience needs to be much richer for content creation and to provide a natural and delightful experience, which is expected with the more direct interaction that touch affords.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a launching mechanism for context based menus. A launcher indicator may be provided at a fixed or dynamic location on a user interface enabling a user to activate a context based menu or to execute an item on that context based menu through a variety of touch/gesture actions, keyboard input, mouse clicks, or similar actions directly related to the indicator or through inference from an action on the displayed content such as selection of a portion of the content. The launcher indicator may provide contextual information such as a type of available context based menu and appear/disappear in an animated fashion. Location of the indicator may also be dynamically adjusted based on selected content, user action location (i.e., location of a touch), available display area, and so on. Upon activation of the menu, the launcher indicator may disappear or be displayed at a center of the context based menu.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1A:
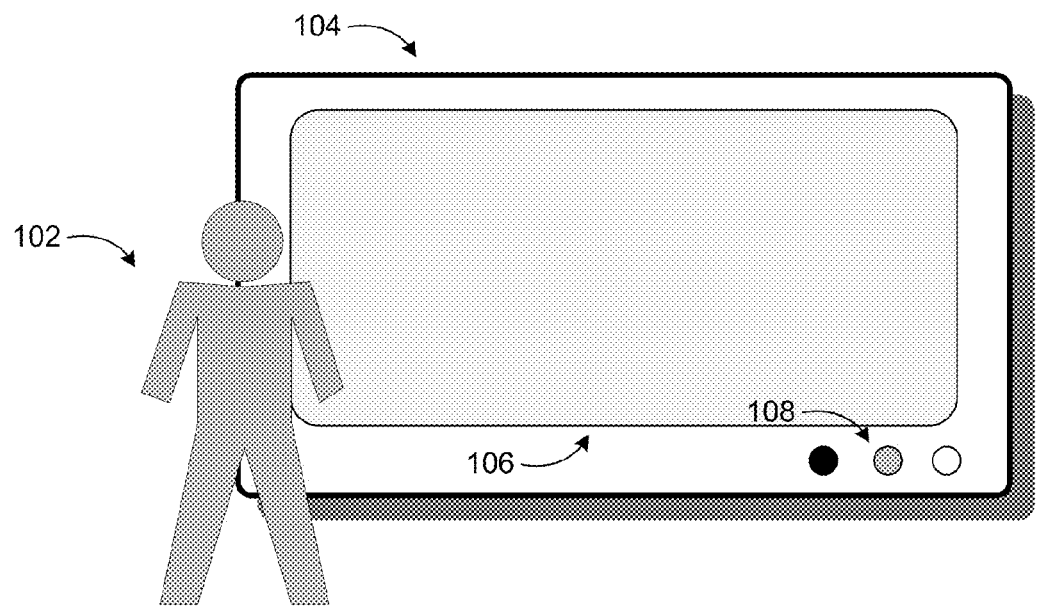
FIGS. 1A and 1B illustrate some example devices, where context based menus and a launcher mechanism for such menus may be employed.
Figure 1A:
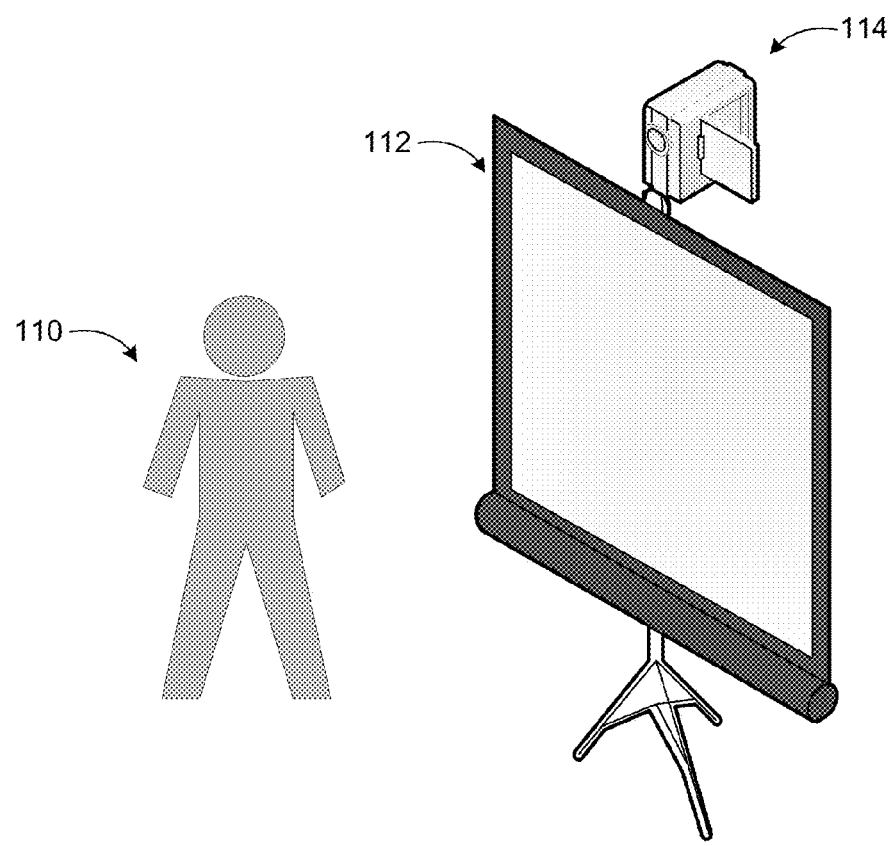

As briefly described above, a launcher indicator may be provided at a fixed or dynamic location on a user interface enabling a user to activate a context based, touch or gesture enabled menu through a variety of touch or gesture actions directly related to the indicator or through inference from an action on the displayed content such as selection of a portion of the content. Upon activation of the menu, the launcher indicator may disappear or be displayed at a center of the context based menu.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in the limiting sense, and the scope of the present invention is defined by the appended claims and their equivalents. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

According to embodiments, a touch-enabled or gesture-enabled menu refers to context based command menus that make use of features specific to touch or gesture enabled computing devices, but may also work with a traditional mouse and keyboard. Context based menus are used to provide quick access to commonly used commands while viewing or editing documents, emails, contact lists, other communications, or any content (e.g., audio, video, etc.). Context based menus may appear as part of a user interface's regular menu, in a separate viewing pane (e.g., a window) outside or inside the user interface, and so on. Typically, context based menus present a limited set of commands for easy user access, but additional sub-menus may be presented upon user selection. Commonly used context based menus may appear over the viewed document.

Figure 1B:
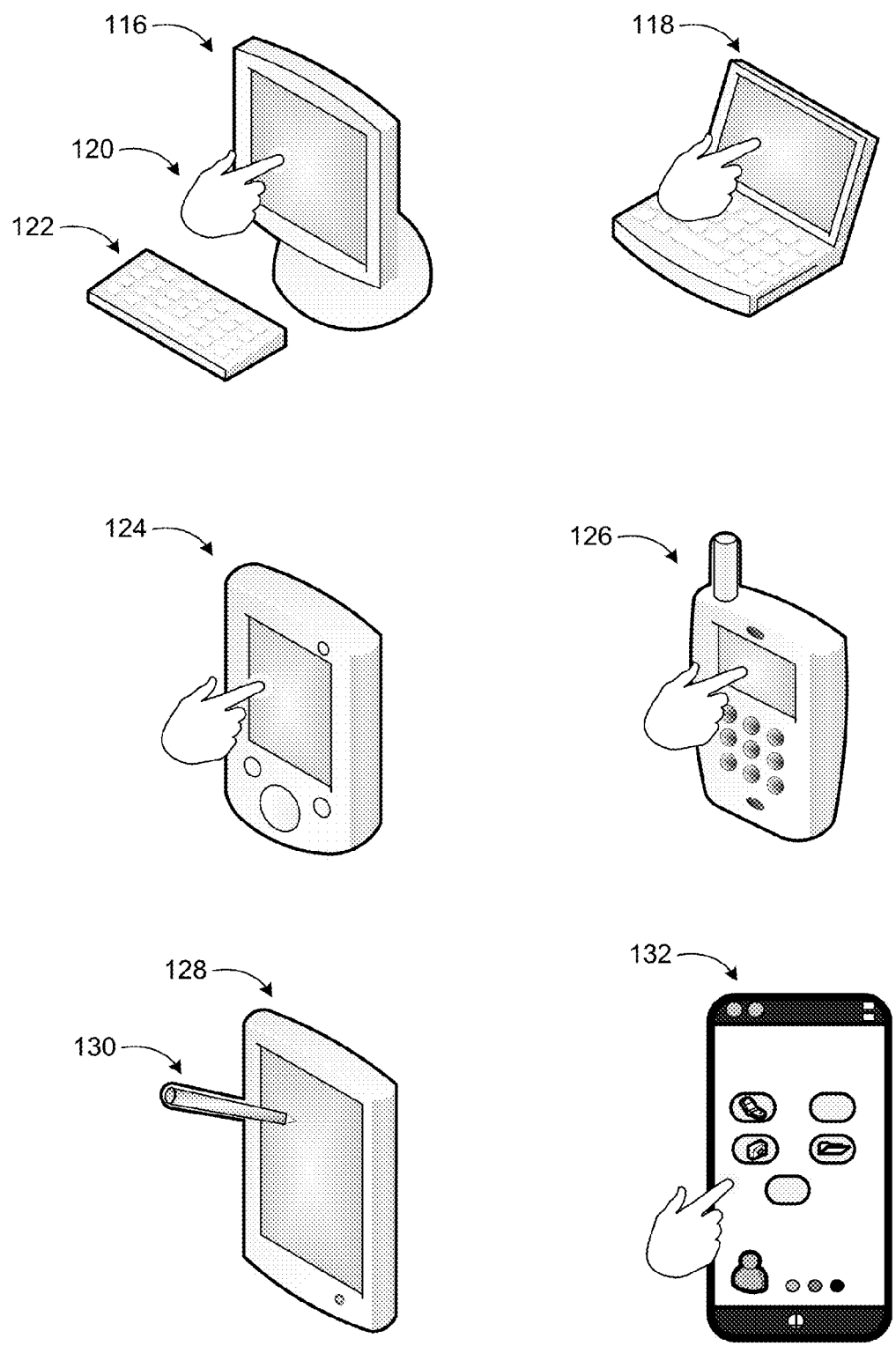

FIGS. 1A and 1B illustrate some example devices, where context based menus and a launcher mechanism for such menus may be employed. As touch and gesture based technologies are proliferating and computing devices employing those technologies are becoming common, user interface arrangement becomes a challenge. Touch and/or gesture based devices, specifically portable devices, tend to have smaller screen size, which means less available space for user interfaces. For example, in a user interface that enables editing of a document (text and/or graphics), in addition to the presented portion of the document, a virtual keyboard may have to be displayed further limiting the available space ("real estate"). Thus, in such scenarios, providing a full control menu may be impractical or impossible. Embodiments are directed to a launcher mechanism for activating a dynamic touch or gesture enabled, context based menu.

As mentioned above, smaller available display space, larger content, and different aspect ratios make conventional menus impractical. Existing touch-based devices such as tablet PCs and similar ones are typically directed to data consumption (i.e., viewing). On the other hand, commonly used applications such as word processing applications, spreadsheet applications, presentation applications, and comparable ones are directed to creation (generating and editing documents with textual, graphical, and other content). Currently available context based menus are either invisible most of the time or they block the content when they are visible. A context based menu according to some embodiments may be provided dynamically based on presented content and available space and activated through a launcher mechanism that provides ease of use without usurping much needed display area.

Referring to FIGS. 1A and 1B, some example devices are illustrated, where a touch or gesture enabled, context based menu may be provided through activation by a launcher mechanisms according to embodiments. Embodiments may be implemented in other devices as well, with varying form factors and capabilities, as long as the devices are touch and/or gesture enabled.

Device 104 in FIG. 1A is an example of a large size display device, where a user interface may be provided on screen 106. Functionality of various applications may be controlled through hardware controls 108 and/or soft controls such as a touch or gesture enabled menu displayed on screen 106. A user may be enabled to interact with the user interface through touch actions or gestures (detected by a video capture device). A launcher indicator may be presented at a fixed location or at a dynamically adjustable location for the user to activate the touch or gesture enabled menu. Examples of device 104 may include public information display units, large size computer monitors, and so on.

Device 112 in FIG. 1A is an example for use of a gesture based menu to control functionality. A user interface may be displayed on a screen or projected on a surface and actions of user 110 may be detected as gestures through video capture device 114. The user's gestures may activate a touch or gesture enabled menu through a launcher indicator displayed on the device 112.

FIG. 1B includes several example devices such as touch enabled computer monitor 116, laptop computer 118, hand-held computer 124, smart phone 126, tablet computer (or slate) 128, and mobile computing device 132, which may be used for computing, communication, control, measurement, and a number of other purposes. The example devices in FIG. 1B are shown with touch activation 120. However, any of these and other example devices may also employ gesture enabled activation of context based menus through a launcher indicator. In addition, tools such as pen 130 may be used to provide touch input. A launcher indicator and a touch or gesture enabled, context based menu may be controlled also through conventional methods such as a mouse input or input through a keyboard 122.

Figure 2A:
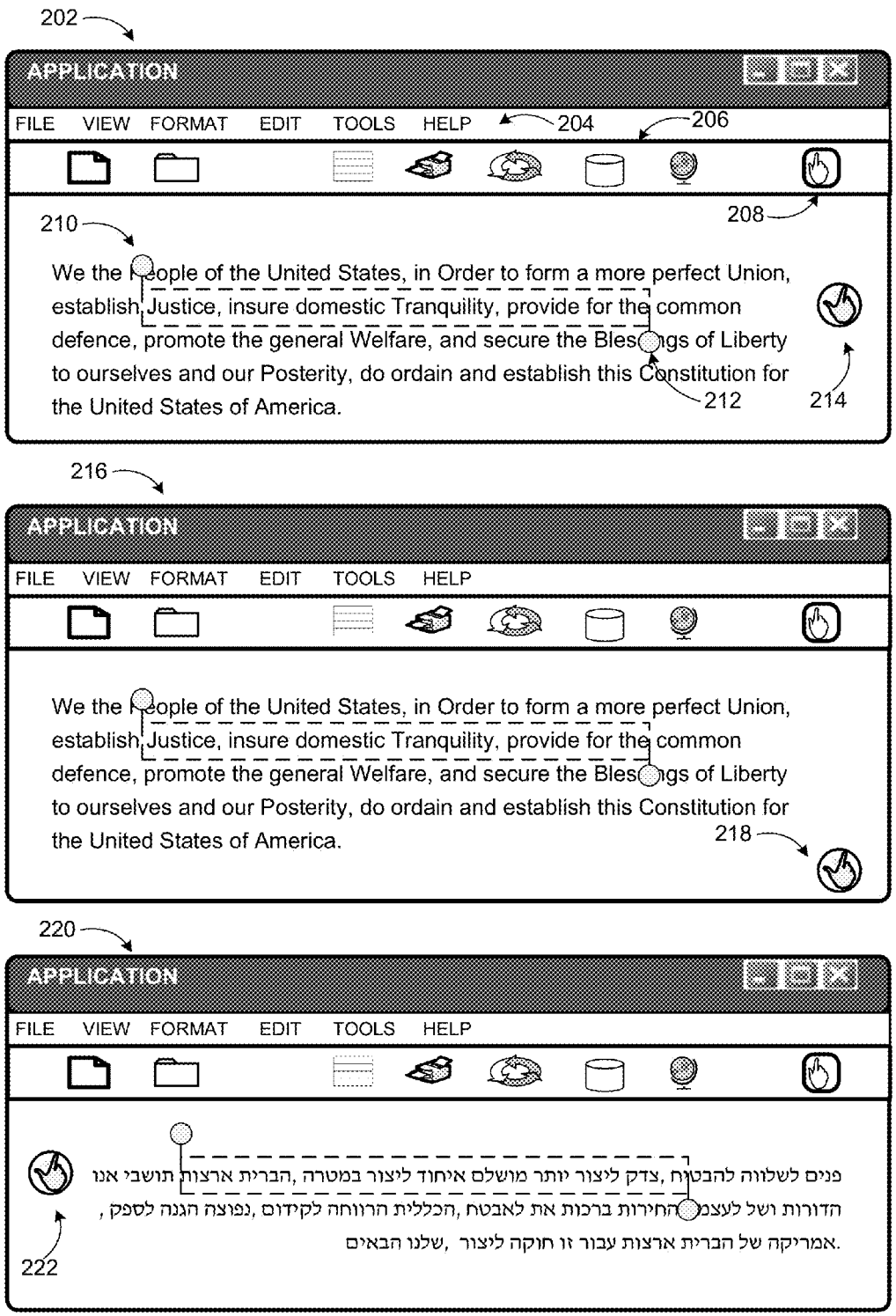
FIGS. 2A, 2B, and 2C illustrate some examples of fixed and dynamic locations of a launcher indicator of a launcher mechanism for context based menus according to embodiments.
Figure 2B:
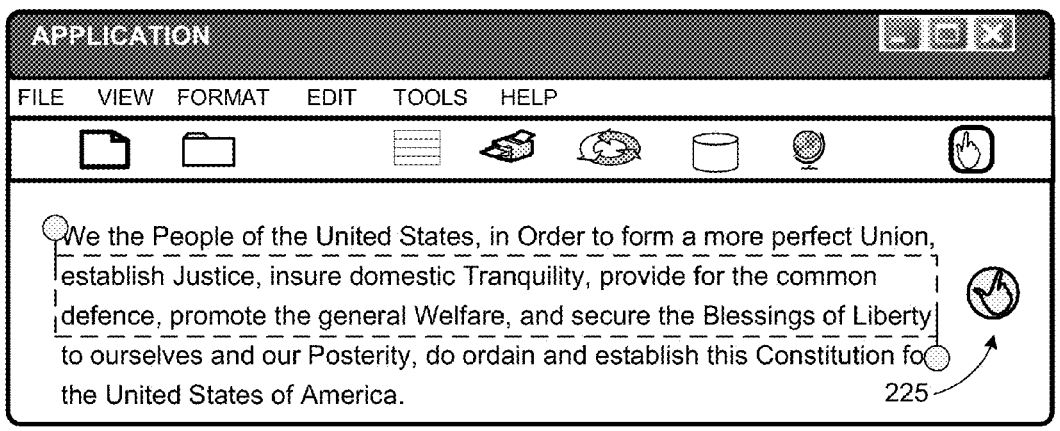
Figure 2B:
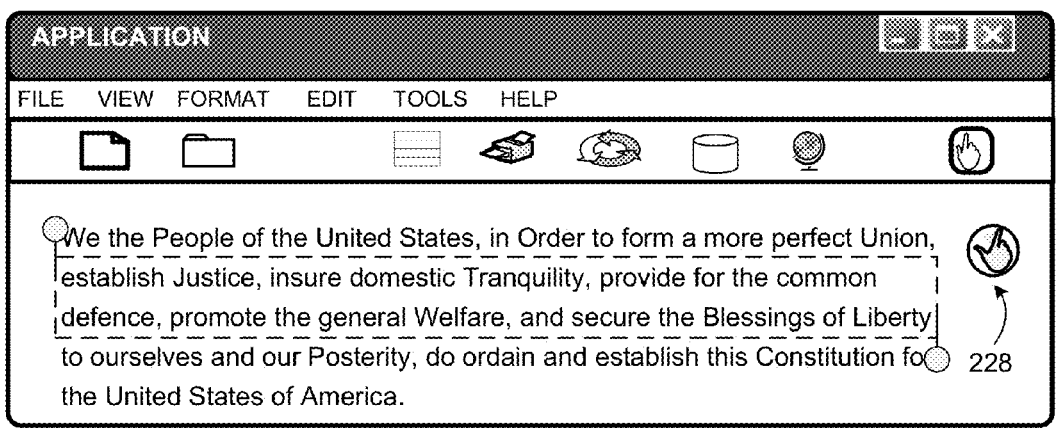
Figure 2B:
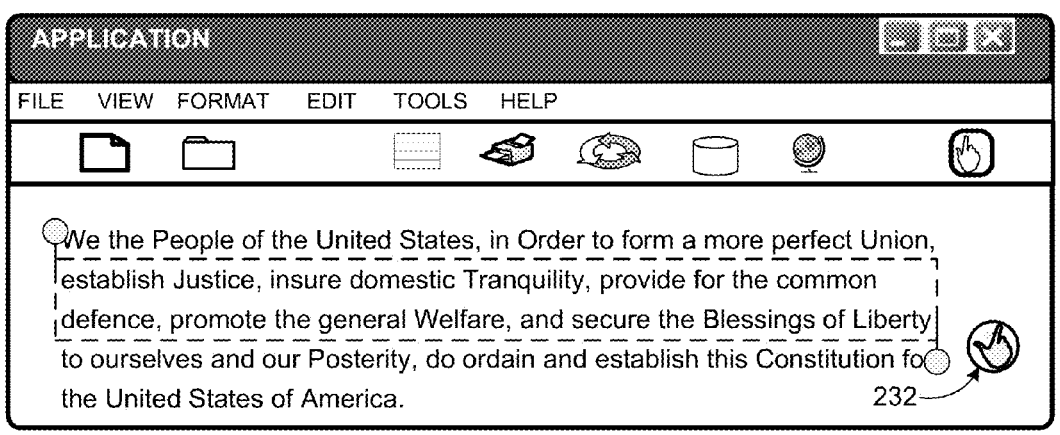
Figure 2C:
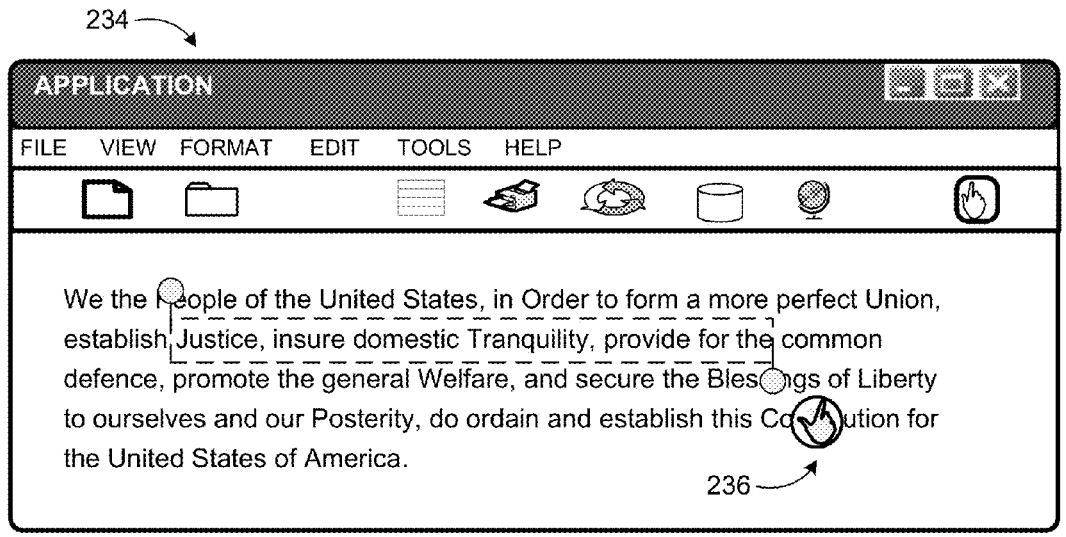
Figure 2C:
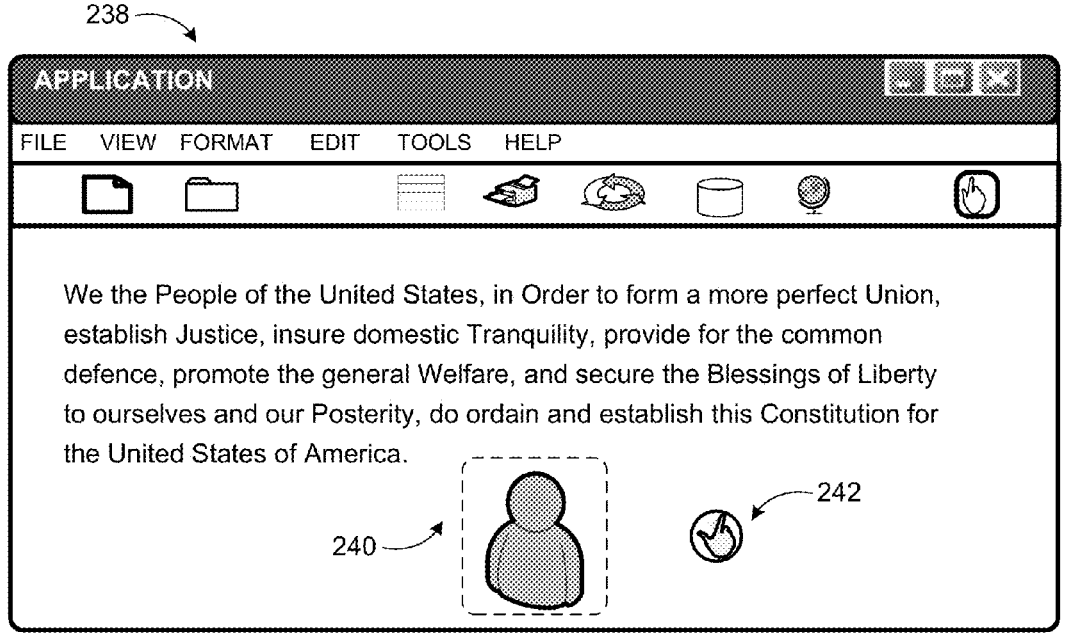

FIGS. 2A, 2B, and 2C illustrate some examples of fixed and dynamic locations of a launcher indicator of a launcher mechanism for context based menus according to embodiments. A context based menu according to embodiments can appear close to a focus point (insertion point or selection), enable efficient invocation and/or use, allow commands to be scoped by context, provide increased scan ability (through radial shape), allow a fast learning curve for first time users, and enhance user experience. Such a menu may be implemented in any application that enables content to be viewed and/or edited, as well as in operating system user interfaces.

The example configurations of launcher indicators in FIG. 2A through 2C are illustrated on example user interfaces, each of which include textual menus 204, graphic command icons 206 and textual and/or graphic content. A launcher indicator according to embodiments may be employed on any user interface with any type of content with or without other types of menus. Referring to user interface 202, a launcher indicator 214 may be used in vicinity of a selection between selection handles 210 and 212 on the user interface. If the user interface does not allow selection or display area is limited, a fixed location may be used for the indicator 208 and/or the underlying context based menu. Alternatively, the launcher may be hidden and a different gesture (e.g., tapping on the selection) may serve as activation for the underlying context based menu. Keyboard, mouse, touch, gesture, pen input, voice commands are some example input mechanisms that may be used in conjunction with the context based menu.

User interface 216 illustrates launcher indicator 218 presented at the lower right corner of the user interface where more display space is available to accommodate the underlying context based menu. The launcher may be positioned far enough from the edges such that when the context based menu grows out from the launcher, there is enough space for the menu to exist. Otherwise, the user has to move their finger from the launcher to the center of the underlying menu. Thus, positioning the launcher in this way allows a more fluid/gestural interaction with the underlying context based menu. User interface 220 in FIG. 2A illustrates how the location of the launcher indicator may be adjusted automatically based on user attributes. For example, the content may be text in a language that is written right-to-left. Thus, indicator 222 may be moved automatically to the left of the user interface 220. Similarly, if an alphabet is used that is written in vertical direction, the indicator 222 may be positioned above or below the selection. Other user attributes that may be used to adjust location of the indicator may include, but are not limited to, at least one from a set of: a left or right handedness of a user, a size of fingers, a size of a pointing device, a user credential, an ergonomic characteristic of the user, and a location attribute comprising one or more of a language selection for the user interface, geographic location information, time zone information, and country information. For example, granularity of detectable actions and/or room for a user to provide a swipe (or similar) action is different whether the user uses a narrow tip pen or relatively larger finger. Thus, available space for the launcher indicator (and thereby the underlying context based menu) may vary depending on the size of the pointing device. The user attribute may be extended to user settings associated with credentials where a user has the ability to set positioning preferences (for example, always to the left if user is left handed). Thus, the launcher indicator may be presented at a location relative to selected portion of the displayed content based on a direction of a detected swipe action in some embodiments (e.g., left-to-right or right-to-left).

The indicator may be moved based on changes in the selected document content, insertion point, and/or user interface borders. A positioning logic may also vary depending on available screen area for user content and detection of accessories like an external keyboard (for example, if virtual keyboard is present or not, thereby impacting available area for user content). If an external keyboard is detected, the indicator may be centered above the selection (instead of to the sides). If multiple lines of text are selected as shown in user interfaces 224, 226, and 230, the indicator may be placed at top (228), bottom (232), or middle (225), top left/center/right, bottom left/center/right, inside the selection, etc. If the selection/insertion point is too close to a user interface border to display the full context based menu, the indicator may be moved away from the border, modified to a smaller icon, or displayed partially.

Thus, the indicator may be positioned to where it can open up all menu items after expansion and create enough space for the context based menu. As shown in user interfaces 224, 226, and 230, the indicator may appear relative to a current selection allowing gestures or touch actions such as taps and/or swipes. In other examples, the indicator may allow room for changes in content. For example, the indicator may appear in tables at a fixed distance from the table so that the table can grow without occluding the indicator. The launcher indicator may also be moved if the size of an underlying object changes (e.g., if more text is added to a line of text, if the size of an image is increased or decreased, if columns or rows are added to a table, etc.).

User interfaces 234 and 238 illustrate two additional example configurations. In user interface 234 of FIG. 2C, the indicator 236 is placed over an unselected portion of the textual context. The user interface 238 includes textual as well as graphic content. Upon selection of the graphic content 240 (e.g., by tapping on it), the launcher indicator 242 appears near the selected object and activates a context based menu associated with graphic object related commands. According to further embodiments, a user gesture may be used to move the launcher. For example, if the launcher happens to be over content that the user needs to get to, then they could press and hold on the launcher "dislodging it" and then drag and drop it elsewhere on the screen.

Figure 3A:
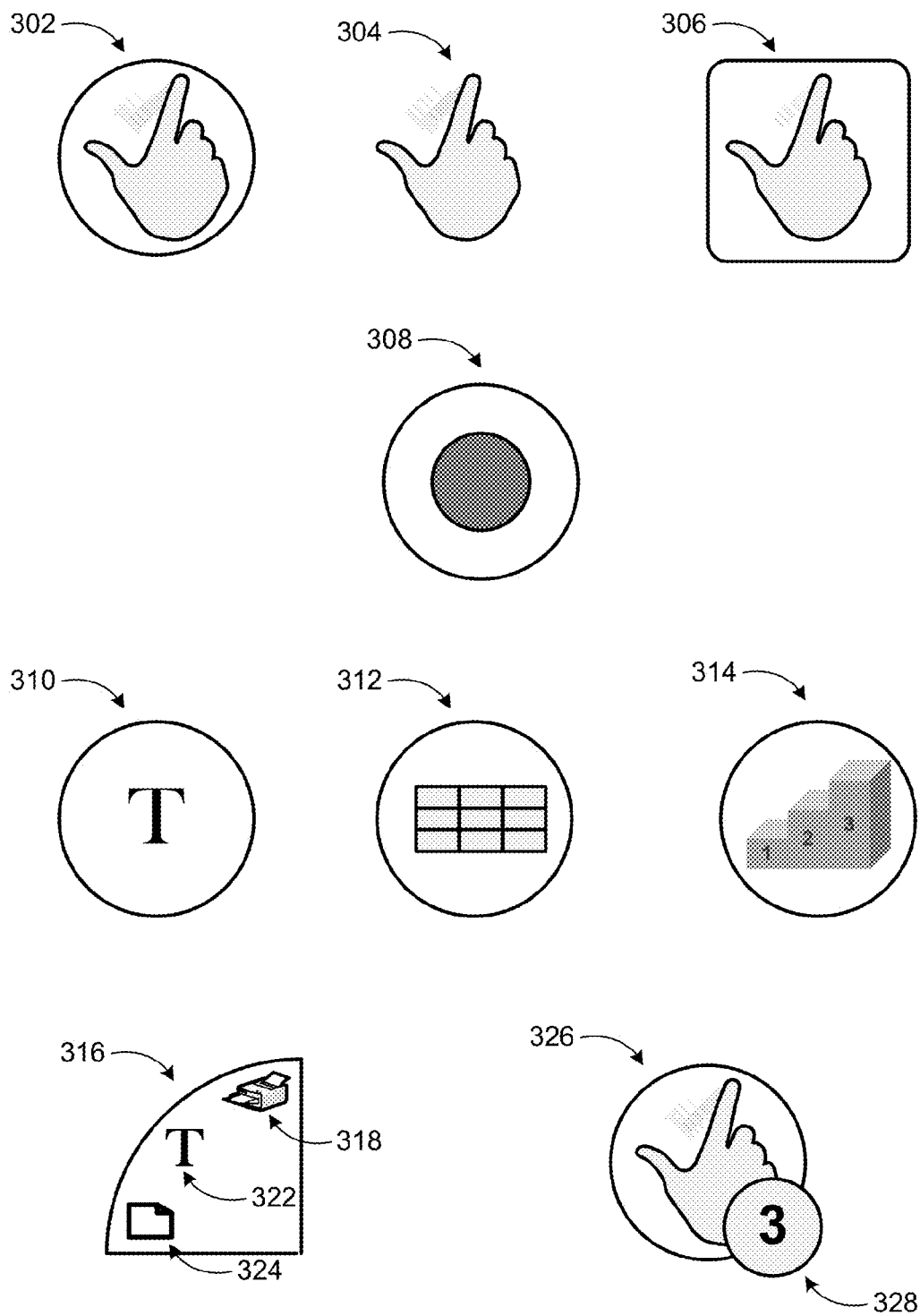
FIGS. 3A and 3B illustrate some example launcher indicators according to embodiments.
Figure 3B:
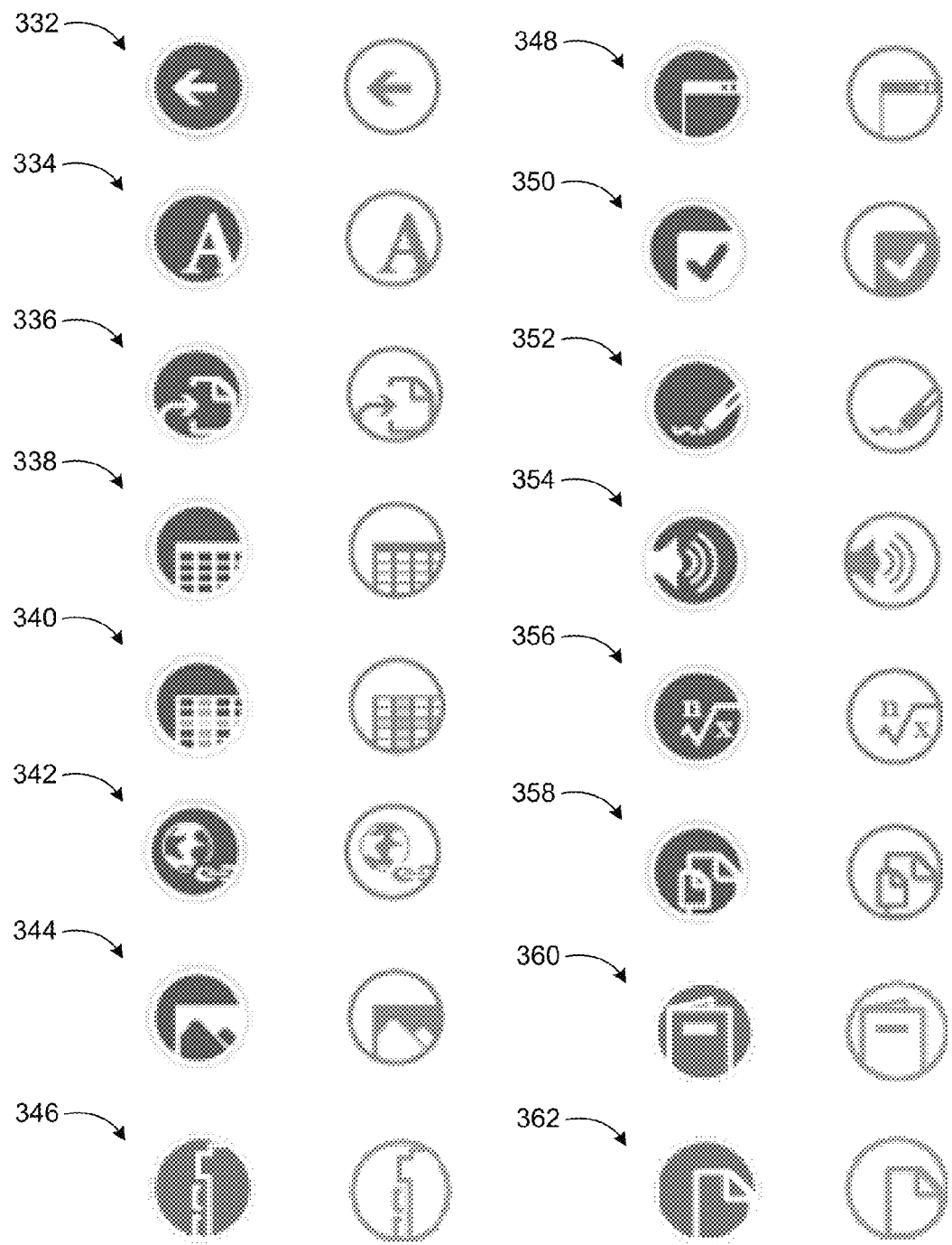

FIGS. 3A and 3B illustrate some example launcher indicators according to embodiments. A launcher indicator according to embodiments may be any graphical, textual, or combination objects. Indicators 302, 304, 306, and 308 are examples of simple graphical objects that may be used to activate a context based menu.

According to other embodiments, the launcher indicator may also be used to present some contextual information. For example, indicator 310 including a letter may be used to represent a context based menu that includes text attribute related commands (e.g., font size, font style, font color, etc.). Indicator 312 may be used to represent a context based menu that includes commands associated with a table. Similarly, indicator 314 may be used to represent a context based menu that includes commands associated with formatting or otherwise controlling attributes of charts.

According to further embodiments, a partial context based menu such as a quarter radial menu 316 may be used as a launcher indicator. The example indicator displays some of the available commands such as open document command 324, font style command 322, and print command 318. According to yet other embodiments, the launcher indicator may be used to present additional information about a status of the underlying context based menu. For example, more than one item may be selected within the application content and it may not be clear that the indicator is acting on all of the items, as opposed to just the item that the radial menu indicator appears near. To better draw the connection, indicator 326 may be shown with the number of items 328 selected.

A number of schemes may be employed to enhance the effectiveness of the launcher indicator such as a color scheme, a graphical scheme, a shading scheme, an animation scheme, and comparable ones. FIG. 3B illustrates example indicators in dark and light formats, which may be used interchangeably depending on a background color. In some embodiments, the light formats may be used to keep the visual of the indicator around within the context based menu after the menu opens. The example indicators include: indicators 332 associated with backward move operations, indicators 334 associated with text selection operations, indicators 336 associated with insert operations, indicators 338 associated with table formatting (and/or creation) operations, indicators 340 associated with operations on table sections, indicators 342 associated with hyperlink operations (e.g., insert, remove, edit, open), indicators 344 associated with image operations, indicators 346 associated with section operations; indicators 348 associated with note container operations, indicators 350 associated with tag or task operations, indicators 352 associated with inking operations, indicators 354 associated with audio/video control operations, indicators 356 associated with equation editing operations, indicators 358 associated with embedded file operations, indicators 360 associated with notebook operations, and indicators 362 associated with file operations.

Of course, other icons, symbols, textual content, etc. may be used to represent specific context based menus and sub-menus. According to some embodiments, a context based touch or gesture enabled menu may be activated without a launcher indicator being displayed. For example, the menu may be presented directly in response to selection of a portion of the displayed content. The menu may also be presented just based on a gesture. For example, press and hold anywhere on the screen or pressing the context menu key on the keyboard may display the context based menu.

Figure 4:
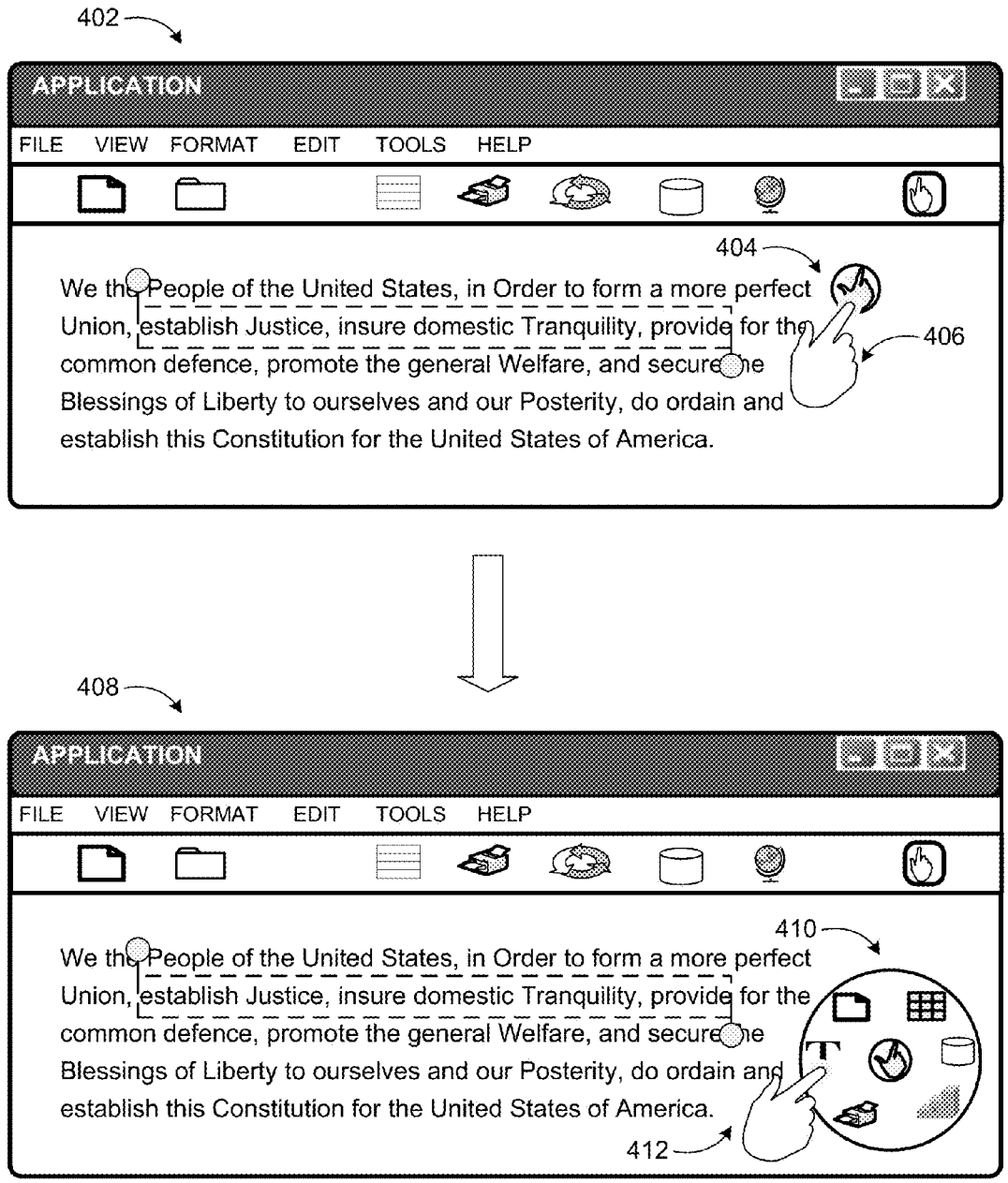
FIG. 4 illustrates activation of a touch or gesture enabled, context based menu through a launcher indicator.

FIG. 4 illustrates activation of a touch or gesture enabled, context based menu through a launcher indicator. An underlying touch or gesture enabled menu may be activated by selecting a launcher indicator through tapping, pressing and holding, dragging/sliding or similar action.

In user interface 402 of FIG. 4, launcher indicator 404 associated with a selected textual content is selected through a tapping action 406. Upon selection of the indicator 404, the context based menu 410 appears in user interface 408, while the launcher indicator 404 disappears or is shown at the center of the context based menu as a context indicator (e.g., level of menu or return to previous menu indicator). The context based menu 410 may employ a hub & spoke interaction at the top level, while dial and/or hub & spoke interactions may be enabled at sub-menu levels. The context based menu may be presented in any form including, but not limited to a radial/circular shape shown in FIG. 4. Touch based interactions 412 may include a slide to a menu item, a slide around the perimeter, or a tap on a menu item. Live preview of a selected or considered menu item may be provided. Also, textual identifiers for various menu items may be provided at the bottom/top/center or vicinity of each menu item.

Figure 5:
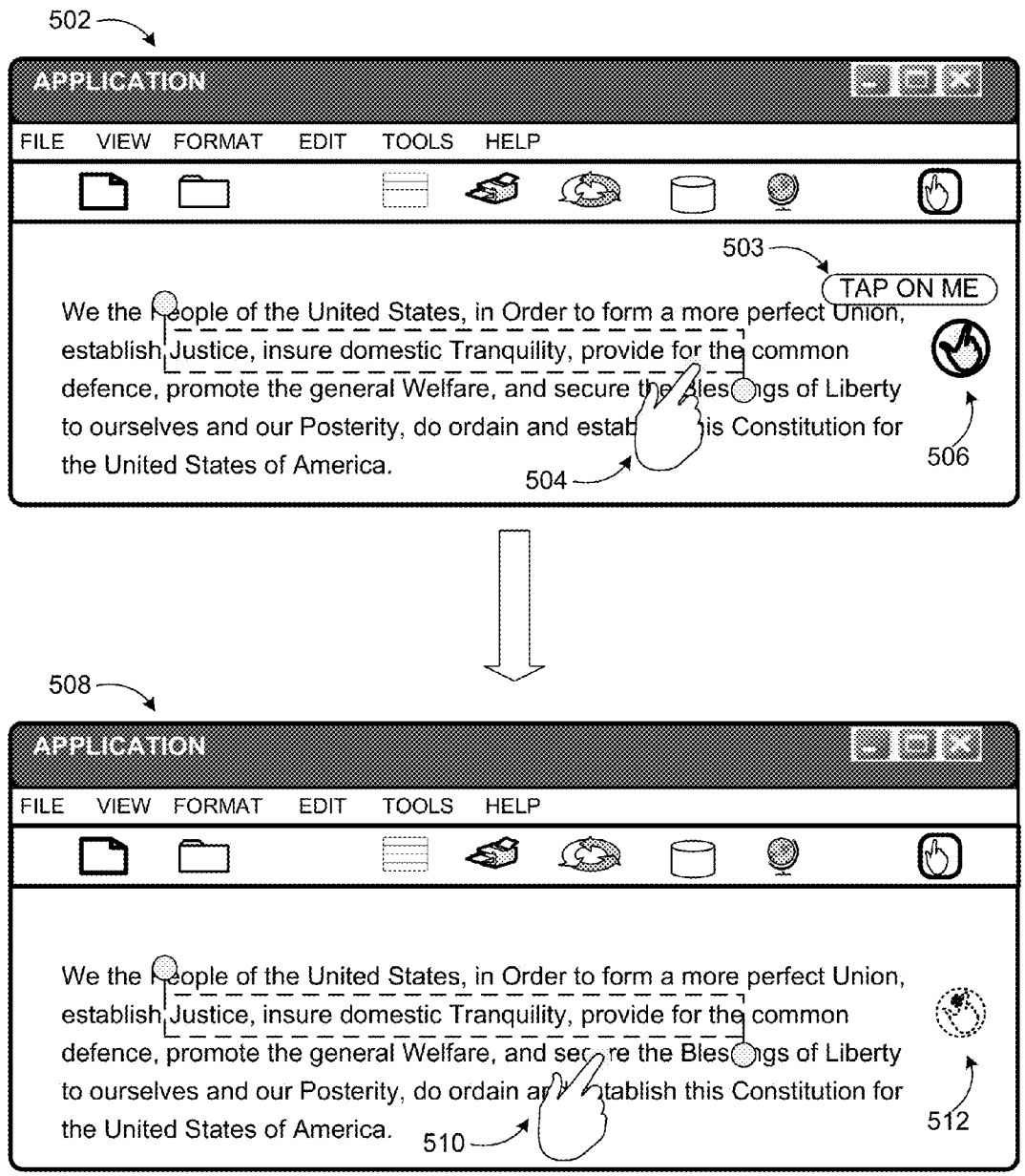
FIG. 5 illustrates an example disappearance of a launcher indicator according to some embodiments.

FIG. 5 illustrates an example disappearance of a launcher indicator according to some embodiments. As shown on user interface 502, a launcher indicator 506 according to embodiments may be invoked in response to selection of a portion of displayed content, tapping action on a fixed indicator on the screen, tapping on a selected object or text (504), tapping on selection handles, or a keyboard combination. Moreover, a tooltip 503 may be displayed when a user hovers over an area, where the indicator may be displayed. The tool tip 503 may also be used to remind a user that the indicator has been activated, but no action has been received.

The indicator 506 may be shown all the time or hidden until a user indication is received (e.g. selection). The context based menu may be invoked by a tap (press and release) or a hold (timer based). Alternatively, some functionality may be performed if a gesture is received on the indicator 506 without displaying the full menu. For example, a swipe to a menu item may be well-known to the users after a while and upon receiving that swipe over the indicator, the application may perform the functionality associated with that menu item without displaying the menu. In some cases, even if a command is executed from the indicator, a tool tip may be persisted for a brief period to indicate that the command has been executed.

User interface 508 of FIG. 5 illustrates an example of how the indicator may be hidden. In the shown example, indicator 512 fades out in response to a tapping or similar action (510) by the user away from the indicator position. Other events that may lead to animated or static disappearance of the indicator may include tapping on a side of the indicator, scrolling a page, zooming in or out, entering new content (e.g., typing), moving to another user interface on the display, etc. In addition to disappearing, the indicator may also be moved in response to a gesture or touch action to another location or pinned to a fixed location.

Figure 6:
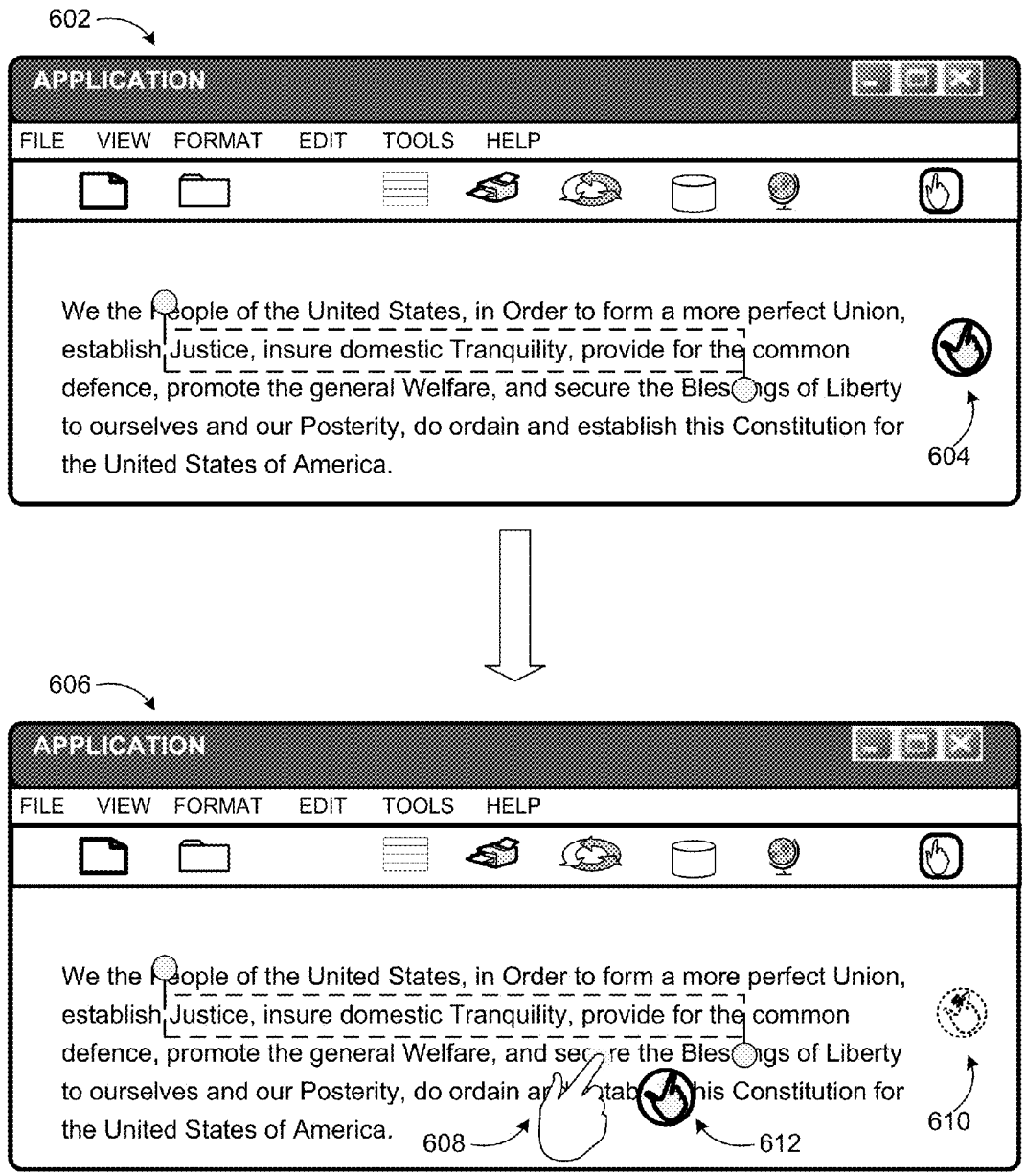
FIG. 6 illustrates an example dynamic location adjustment of a launcher indicator according to other embodiments.

FIG. 6 illustrates an example dynamic location adjustment of a launcher indicator according to other embodiments. Various dynamic location and/or size adjustments may be employed in associated with a launcher indicator based on selected content, available display area, other content elements, device type, and so on.

For example, the launcher indicator may move if it appears in one place and then reappear elsewhere in response to an event such as user action, change in displayed user interface or content (e.g., size change). In some examples, predefined user actions such as keyboard input combinations or specific gestures may cause the indicator to move between predefined locations (different corners of the user interface, left or right of selected content, etc.). In other examples, the location change may be based on user action location. For example, the launcher indicator 604 on user interface 602 is shown in an empty area to the right of selected textual content. In response to a tap action 608 by the user on user interface 606, the indicator 610 may disappear (e.g., fade out) and reappear near the tap action as indicator 612.

The example launcher indicators, configurations, and context based menus depicted in FIGS. 1 through 6 are provided for illustration purposes only. Embodiments are not limited to the shapes, forms, and content shown in the example diagrams, and may be implemented using other textual, graphical, and similar schemes employing the principles described herein.

Figure 7:
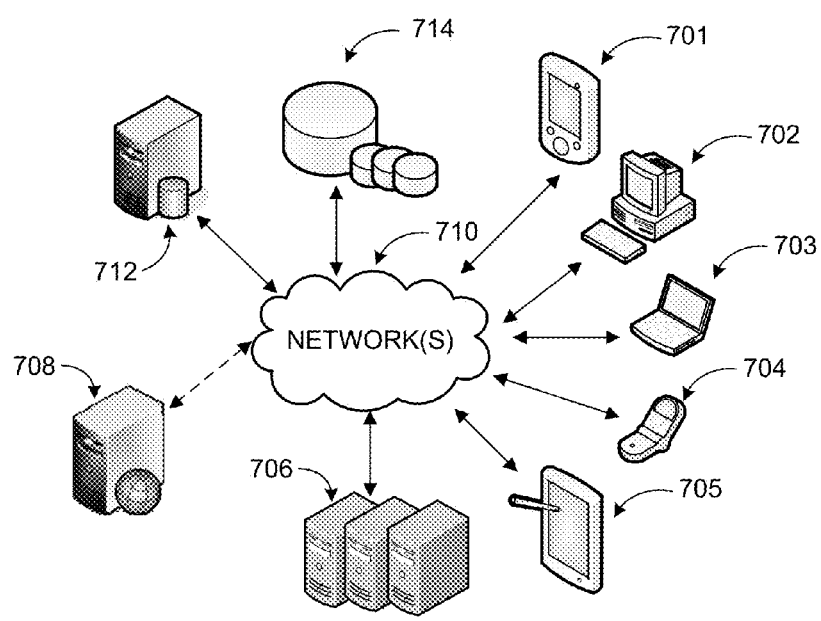
FIG. 7 is a networked environment, where a system according to embodiments may be implemented.

FIG. 7 is an example networked environment, where embodiments may be implemented. In addition to locally installed applications, such as application 822 discussed below, a launcher mechanism for touch and/or gesture enabled menus may also be employed in conjunction with hosted applications and services that may be implemented via software executed over one or more servers 706 or individual server 708. A hosted service or application may communicate with client applications on individual computing devices such as a handheld computer 701, a desktop computer 702, a laptop computer 703, a smart phone 704, a tablet computer (or slate), 705 (client devices') through network(s) 710 and control a user interface presented to users.

As discussed, a context based touch or gesture enabled menu may be used for controlling functionality provided by the hosted service or application. The context based menu may be activated through a fixed or dynamic location launcher indicator.

Client devices 701-705 are used to access the functionality provided by the hosted service or application. One or more of the servers 706 or server 708 may be used to provide a variety of services as discussed above. Relevant data may be stored in one or more data stores (e.g. data store 714), which may be managed by any one of the servers 706 or by database server 712.

Network(s) 710 may comprise any topology of servers, clients, Internet service providers, and communication media. A system according to embodiments may have a static or dynamic topology. Network(s) 710 may include a secure network such as an enterprise network, an unsecure network such as a wireless open network, or the Internet. Network(s) 710 may also coordinate communication over other networks such as PSTN or cellular networks. Network(s) 710 provides communication between the nodes described herein. By way of example, and not limitation, network(s) 710 may include wireless media such as acoustic, RF, infrared and other wireless media.

Many other configurations of computing devices, applications, data sources, and data distribution systems may be employed to provide a launcher mechanism for context based menus. Furthermore, the networked environments discussed in FIG. 7 are for illustration purposes only. Embodiments are not limited to the example applications, modules, or processes.

Figure 8:
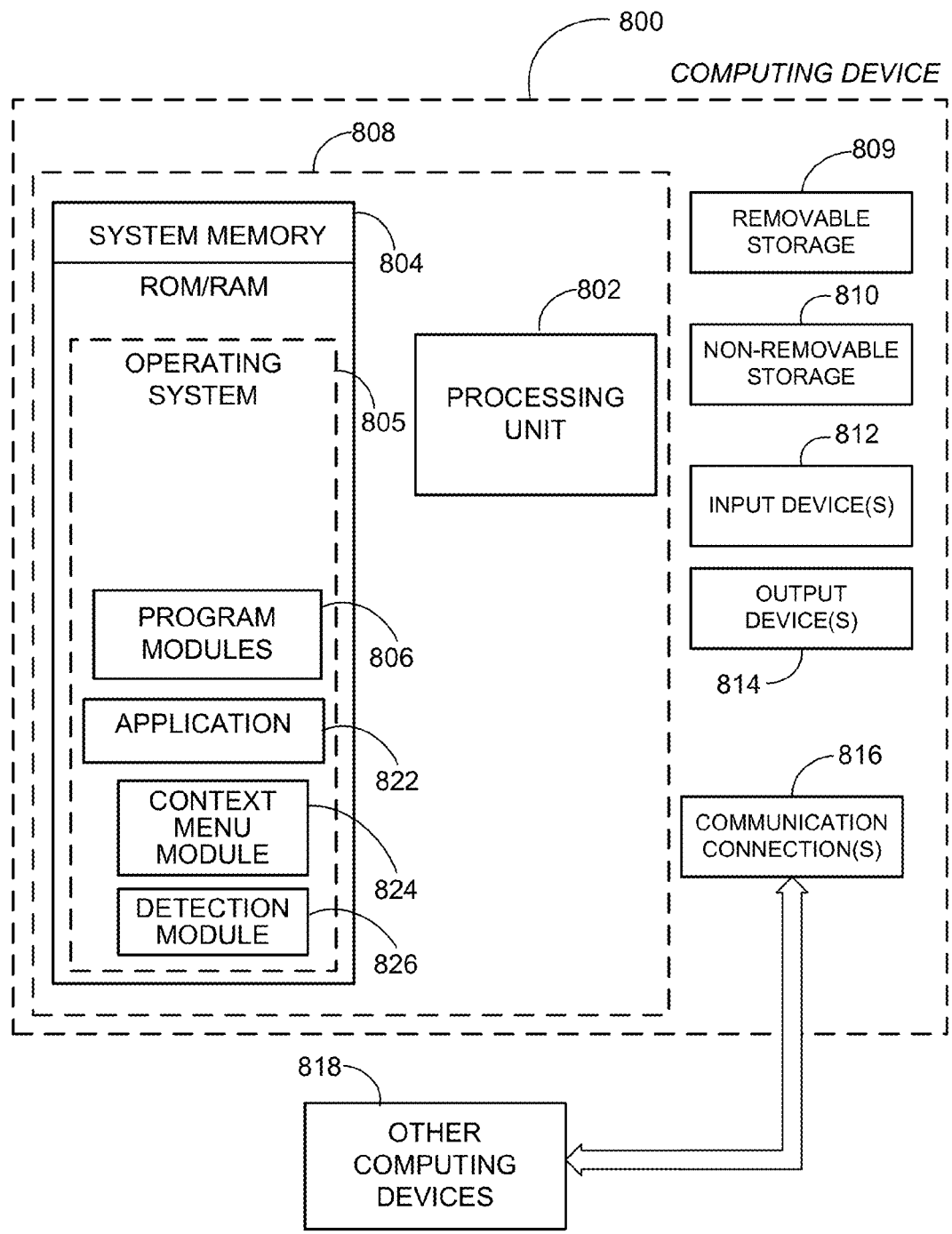
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment for an application according to embodiments is illustrated, such as computing device 800. In a basic configuration, computing device 800 may be any touch and/or gesture enabled device in stationary, mobile, or other form such as the example devices discussed in conjunction with FIGS. 1A, 1B, and 7, and include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of the platform, such as the WINDOWS®, WINDOWS MOBILE®, or WINDOWS PHONE® operating systems from MICROSOFT CORPORATION of Redmond, Wash. The system memory 804 may also include one or more software applications such as program modules 806, application 822, context based menu module 824, and detection module 826.

Context based menu module 824 may operate in conjunction with the operating system 805 or application 822 and provide a touch and/or gesture enabled, context based menu as discussed previously. Context based menu module 824 may also present a launcher indicator in response to a number of predefined events and enable activation of the menu through the launcher indicator. Detection module 826 may detect activation of the launcher indicator and/or selection of various context based menu items. This basic configuration is illustrated in FIG. 8 by those components within dashed line 808.

Computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer readable storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer readable storage media may be part of computing device 800. Computing device 800 may also have input device(s) 812 such as keyboard, mouse, pen, voice input device, touch input device, an optical capture device for detecting gestures, and comparable input devices. Output device(s) 814 such as a display, speakers, printer, and other types of output devices may also be included. These devices are well known in the art and need not be discussed at length here.

Computing device 800 may also contain communication connections 816 that allow the device to communicate with other devices 818, such as over a wireless network in a distributed computing environment, a satellite link, a cellular link, and comparable mechanisms. Other devices 818 may include computer device(s) that execute communication applications, other directory or policy servers, and comparable devices. Communication connection(s) 816 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 9:
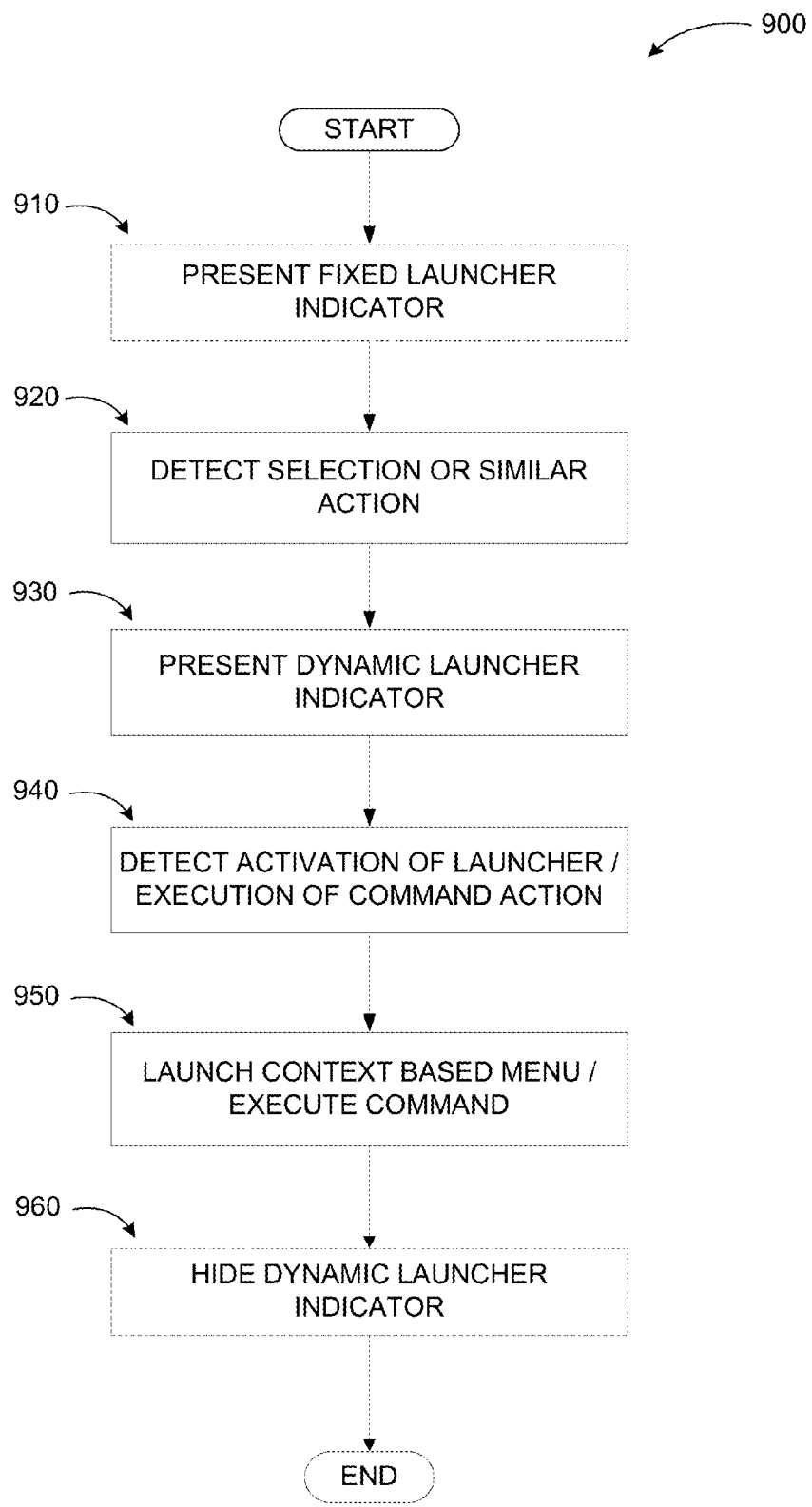
FIG. 9 illustrates a logic flow diagram for a process of employing a launcher mechanism for context based menus according to embodiments.

FIG. 9 illustrates a logic flow diagram for a process of employing a launcher mechanism for context based menus according to embodiments. Process 900 may be implemented as part of an application or an operating system.

Process 900 begins with optional operation 910, where a fixed location launcher indicator may be presented through a user interface of an application of operating system. The fixed location indicator may be an icon as part of a graphical menu on the user interface, a textual command, or a combination of the two. At operation 920, a selection operation or similar action (e.g., tapping or equivalent gesture on the screen) may be detected. Upon detection of a portion of the content or similar user action, a dynamic launcher indicator may be presented at operation 930. The location of the dynamic launcher indicator may be selected automatically based on selected content, location of user action, available display area, locale attributes (e.g., if the language is a right-to-left written language), and similar factors.

Following the presentation of the launcher indicator and prior to operation 940, the launcher indicator may be hidden in response to a number of events such as expiration of a timer, user action at a different location on the user interface, a different type of user action (e.g., selection of another user interface or addition of new content). The launcher indicator may appear/disappear and move (e.g., slide across the screen) in an animated fashion. At operation 940, an action (e.g., gesture, touch, keyboard entry, mouse click, pen input, etc.) associated with the activation of the launcher or execution of a command may be detected. Upon detection of the activation of the launcher or execution of the command, a context based menu may be presented at operation 950 or the command executed.

Upon presentation of the context based menu or execution of the command, the launcher indicator may be hidden at operation 960. In some embodiments, the launcher indicator may be displayed at the center of the context based menu instead of being completely hidden. As mentioned above, the disappearance of the launcher indicator may be animated as well.

The operations included in process 900 are for illustration purposes. Presenting a launcher indicator for context based menus according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed in a computing device for providing a launch mechanism for context based menus, the method comprising:
    in response to detecting a selection of a portion of displayed area on a user interface or a user action on the user interface, presenting a launcher indicator associated with an underlying context based menu, wherein a location of the launcher indicator is selected based on the selected portion of the displayed area;
    adjusting the location of the launcher indicator automatically based on a direction of writing associated with the selected portion of the displayed area and one or more user attributes, wherein the one or more user attributes include at least one of a left or right handedness of a user, a size of fingers or a pointing device, or a user positioning preference;
    detecting another user action associated with the displayed launcher indicator; and
    in response to the other user action,
        executing a command and displaying a tool tip as an indication of the executed command or
        displaying the underlying context based menu and displaying another tool tip as a reminder that the launcher has been activated, but no action has been received.

2. The method of claim 1, wherein the user action and the other user action include at least one from a set of: a tap action on a fixed indicator on the user interface, a keyboard entry combination, a mouse input, a pen input, a tap action on a selected object, and a tap action on one of a pair of content selection handles.

3. The method of claim 1, further comprising:
    presenting the launcher indicator at a fixed location on the user interface or a dynamically selected location based on at least one from a set of: the selected portion of the displayed area, a displayed content type, available display area, user interface borders, and a device type.

4. The method of claim 1, further comprising:
    presenting the launcher indicator along a left side, a right side, a top, or a bottom of the selected portion of the displayed area based on the one or more user attribute.

5. The method of claim 1, wherein the one or more user attributes include at least one from a set of: a user credential, an ergonomic characteristic of the user, and a location attribute comprising one or more of a language selection for the user interface, geographic location information, time zone information, and country information.

6. The method of claim 1, further comprising:
    automatically moving the launcher indicator in response to a change of the one or more user attributes.

7. The method of claim 1, further comprising one or more of:
    presenting the launcher indicator at the location relative to selected portion of the displayed area such that sufficient display area is provided for the underlying context based menu.

8. The method of claim 7, further comprising:
    if there is insufficient display area between the selected portion of the display area and a user interface border to display the underlying context based menu, automatically moving the launcher indicator to another location on the user interface, reducing a size of the launcher indicator, or displaying the launcher indicator partially.

9. The method of claim 1, further comprising:
    automatically moving the launcher indicator in response to a change in a size of the selected portion of the displayed area, a change in the size of the user interface, or a change in an orientation of the user interface.

10. The method of claim 1, further comprising:
    enabling a user to move the launcher indicator within the user interface based on a further user action.

11. The method of claim 1, wherein the user action and the other user action are touch or gesture based actions.

12. A computing device for providing a launch mechanism for context based menus, the computing device comprising:
    an input device;
    a memory;
    a processor coupled to the memory and the input device, the processor executing an application and causing a user interface associated with the application to be displayed on a screen, wherein the processor is configured to:
        in response to detecting a selection of a portion of displayed area on the user interface or a first user action on the user interface, present a launcher indicator associated with an underlying context based menu at a fixed location on the user interface or a dynamically selected location based on at least one from a set of: the selected portion of the displayed area, a displayed content type, available display area, user interface borders, and a device type, wherein a location of the launcher indicator is selected based on the selected portion of the displayed area;
        adjust the location of the launcher indicator automatically based on a direction of writing associated with the selected portion of the displayed areaand one or more user attributes, wherein the one or more user attributes include at least one of a left or right handedness of a user, a size of fingers or a pointing device, or a user positioning preference;
if no other user action is detected within a predefined time, hide the launcher indicator;
detect a second user action associated with the displayed launcher indicator; and
in response to the second user action,
hide the launcher indicator and
execute a command and display a tool tip as an indication of the executed command or
display the underlying context based menu and display another tool lip as a reminder that the launcher indicator has been activated, but no action has been received.

13. The computing device of claim 12, wherein the processor is further configured to:
detect a third user action away from the launcher indicator; and
hide the launcher indicator in an animated fashion.

14. The computing device of claim 13, wherein the third user action is associated with scrolling a page, a zooming action, a selection of a different portion of the displayed area, or a new content entry.

15. The computing device of claim 13, wherein the processor is further configured to:
present the launcher indicator in a vicinity of the third user action on the user interface.

16. The computing device of claim 12, wherein the launch mechanism is controlled by the application or an operating system of the computing device.

17. A computer-readable memory device with instructions stored thereon for providing a launch mechanism for touch and gesture enabled menus, the instructions containing:
in response to detecting a selection of a portion of displayed area on the user interface or a touch action or a gesture action on the user interface, presenting a launcher indicator associated with an underlying context based menu at a fixed location on the user interface or a dynamically selected location based on at least one from a set of: the selected portion of the displayed area, a displayed content type, available display area, user interface borders, and a device type, wherein a location of the launcher indicator is selected based on the selected portion of the displayed area;
adjusting the location of the launcher indicator automatically based on a direction of writing associated with the selected portion of the displayed area, and one or more user attributes, wherein the one or more user attributes include at least one of a left or right handedness of a user, a size of fingers or a pointing device, or a user positioning preference;
if no other user action is detected within a predefined time, hiding the launcher indicator;
detecting another one of a touch action or a gesture action associated with the displayed launcher indicator; and
in response to the other one of the touch action or the gesture action,
hiding the launcher indicator and
executing a command and displaying a tool tip as an indication of the executed command or
displaying the underlying context based menu and displaying another tool tip as a reminder that the launcher indicator has been activated, but no action has been received.

18. The computer-readable memory device of claim 17, wherein the launcher indicator comprises a graphic object, a textual object, or a combination of graphic and text object, and wherein at least one from a set of: a color scheme, a graphical scheme, an animation scheme, and a shading scheme is employed to enhance a visual effect of the launcher indicator.

19. The computer-readable memory device of claim 18, wherein the launcher indicator displays contextual information associated with at least one of the selected portion of the displayed area and the underlying context based menu.

* * * * *